United States Patent [19]

Elliott

[11] Patent Number: 4,508,667
[45] Date of Patent: Apr. 2, 1985

[54] MANUFACTURE OF HIGHLY POROUS REFRACTORY MATERIAL

[75] Inventor: Alwyn Elliott, Tollesbury, England

[73] Assignee: Moler Products Limited, Colchester, England

[21] Appl. No.: 426,901

[22] Filed: Sep. 29, 1982

[30] Foreign Application Priority Data

Mar. 2, 1982 [GB] United Kingdom ............. 8206054

[51] Int. Cl.³ .............................................. B01J 2/02
[52] U.S. Cl. ..................................... 264/13; 264/117; 264/121; 264/125
[58] Field of Search ................. 264/117, 121, 125, 13

[56] References Cited

U.S. PATENT DOCUMENTS

| | | | |
|---|---|---|---|
| 3,673,290 | 6/1972 | Brubaker | 264/125 |
| 3,917,778 | 11/1975 | Shiralsi | 264/86 |
| 4,057,605 | 11/1977 | Chauvin | 264/42 |
| 4,208,367 | 6/1980 | Wunning | 264/125 |
| 4,218,413 | 8/1980 | Stowell | 264/42 |

Primary Examiner—John A. Parrish
Attorney, Agent, or Firm—Lockwood, Alex, Fitzgibbon & Cummings

[57] ABSTRACT

A method of manufacturing a highly porous refractory material by feeding raw material in discrete particle form into the hot zone of a furnace chamber, the method including the initial step of making a slurry of the raw material and feeding the slurry into a spray drier to produce particles of refractory material with very little fines.

6 Claims, 4 Drawing Figures

U.S. Patent   Apr. 2, 1985   4,508,667
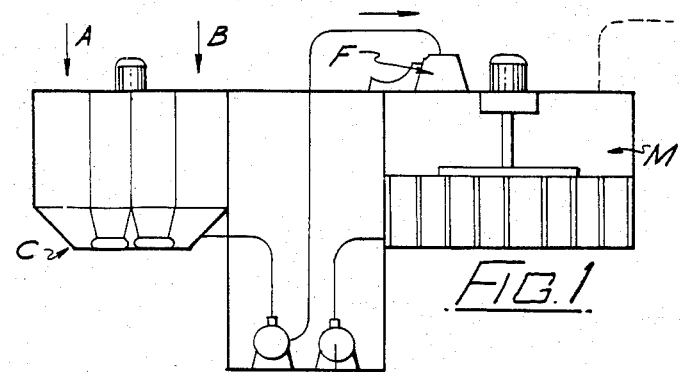
FIG. 1
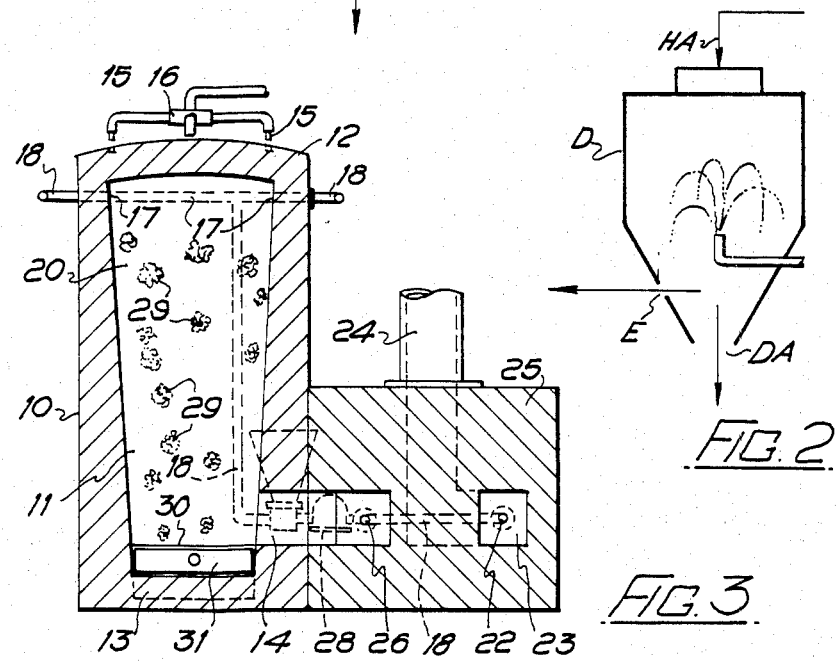
FIG. 2
FIG. 3
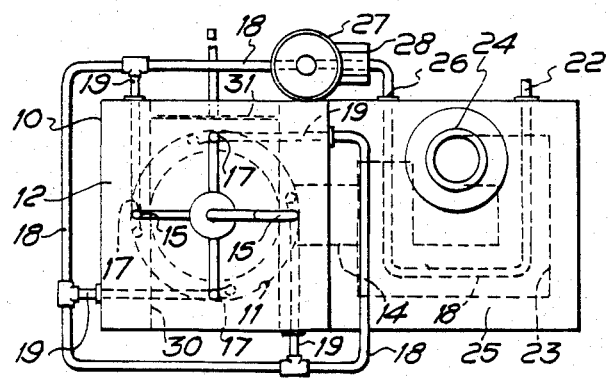
FIG. 4

MANUFACTURE OF HIGHLY POROUS REFRACTORY MATERIAL

The invention relates to the manufacture of highly porous refractory material.

Highly porous refractory materials are used for the manufacture of, for example, refractory insulating bricks for the lining of furnaces.

One method of making refractory insulating bricks involves the use of artificially formed agglomerate refractory masses broken up into particle size for mixing with a bonding clay, the mix then being moulded to the required size and shape and fired in a kiln. Such artificially formed agglomerate refractory masses of high porosity have previously been formed by feeding a raw material, that is to say argillaceous or other refractory material, in discrete particle form into the hot zone of a furnace chamber and into contact with a gaseous medium therein, and subjecting the particles and the gaseous medium to a violent movement within the furnace chamber, for example by admitting secondary air and/or separate conveying air tangentially to the furnace to produce a violent turbulence, to cause said particles to impinge one against another and against surfaces in the hot zone of the furnace chamber, the burning of the gaseous medium producing a temperature high enough to bring the moving particles to a pyro-plastic condition to cause said impinging particles to adhere indiscriminately to one another and to surfaces of the furnace chamber. As this has continued, the particles have accumulated into the agglomerate refractory masses on the surfaces of the hot zone of the furnace chamber until such masses have become large enough to overcome their adherence to said surfaces and have fallen into a cooler zone from where they have been removed in burned and hardened condition.

The above method of forming the required agglomerate refractory masses has been generally successful but has one particular disadvantage, this being that when the raw material has been fed into the hot zone of the furnace chamber, the finer particles of the material have been entrained in the flue gases and carried out of the furnace instead of forming part of the agglomerate mass. Such a loss of raw material, which may have amounted to 40% of the total, was not particularly serious when the material was a relatively cheap fireclay but is very serious when it is desired to use more expensive materials for the production of lightweight aggregates.

The invention as claimed is intended to provide a remedy. It provides a method of making a highly porous refractory material in which the finer particles of the material are not to any significant degree entrained and carried out of the furnace in which the method is partly carried out.

The advantages offered by the invention are mainly that since no significant amount of the finer particles of the raw materials are entrained to be carried away and lost, this results in a considerable cost saving, particularly when the materials being used are relatively expensive materials.

One way of carrying out the invention will now be described by way of example only, with reference to the accompanying drawings, of which:

FIG. 1 is a diagrammatic illustration of apparatus for making a slurry as a first step in a method embodying the invention, FIG. 2 is a diagrammatic illustration of the second step being carried out, that is to say the slurry being fed into a spray drier to produce particles of refractory material of a controlled size range, and FIGS. 3 and 4 are, respectively, a sectional side view and a plan view of a furnace in which subsequent steps in the method are carried out.

Referring now to FIG. 1, this illustrates apparatus for carrying out a first step in the making of a highly porous refractory material by a method embodying the invention, that is to say the mixing together of two or more different kinds of raw materials in a so-called blunger C and the making of a slurry therefrom by the addition of water. The slurry is then pumped into storage tank M through a fine filter screen F. (For the sake of simple illustration the drawing shows the admixture of two different kinds of raw material A and B which may be argillaceous or other refractory materials. Any material which is not argillaceous needs to be added as a fine powder).

In FIG. 2 the slurry which has been made from the raw material is shown being fed into a spray drier D through a nozzle N to produce particles of refractory material with very little fines. As shown, the nozzle atomiser is located in a lower part of the drying chamber and is directed vertically upwards. This arrangement produces a fountain-like spray which meets hot air introduced into the chamber through an inlet aperture HA in its upper end. The spray dried material is discharged from the bottom of the drying chamber through a discharge aperture DA. Exit air flows from the chamber through aperture E. The conditions can be controlled so that the spray dried material falls into the particle size range required. A typical grading of the spray dried mix may be as follows:

+500 μm—1%
−500+250 μm—55%
−250+125 μm—40%
−125 μm—4%

Referring now to FIGS. 3 and 4, the apparatus there illustrated is a furnace apparatus in which subsequent steps in the method are carried out, the apparatus including a brickwork structure 10 of rectangular outline in cross section enclosing a vertical furnace chamber 11 of circular cross section tapering downwardly from a closed crown roof 12 towards the floor 13. An opening 14 is provided in the lower part of the furnace chamber for the exhaust therefrom of waste gases. The upper part of the furnace chamber 11 is supplied with a combustible medium by four burners 15 firing downwardly through the roof 12 at approximately 30° to the vertical, said burners being supplied with combustible medium from a source of supply (not shown) conveyed through a manifold pipe structure 16. Immediately below the roof 12 the furnace chamber 11 is provided at circumferential intervals with four secondary air inlets 17 to which preheated secondary air is conveyed by a supply pipe 18 and branch pipes 19, the latter communicating each with an inlet 17. The secondary air inlets 17 are arranged to communicate into the furnace chamber 11 tangentially thereof and thereby impart a swirling action to the secondary air and to the combustible medium entering the furnace chamber from the burners 15.

The secondary air is supplied in preheated condition by the supply end 22 of pipe 18 entering into and passing through a waste gas flue 23 which communicates with the furnace chamber 11, and with a chimney 24 of a structure 25, said secondary air pipe becoming heated by contact with the hot waste gases leaving the furnace chamber. Where the secondary air supply pipe leaves the flue 23 as shown at 26 said pipe is fitted with a feed hopper 27 at the pressure side of a fan 28.

The material to be treated in the furnace chamber and which has been produced in the spray drier of FIG. 2 is fed into the hopper 27 and owing to the action of the fan 28 operating in the secondary air supply pipe 18 the particles of said material are entrained in the preheated secondary air and fed therewith into the hot zone 20 of the furnace chamber to be given a violent swirling action therein while being subjected to a sufficiently high temperature and for a length of time to ensure that the particles become pyro-plastic.

Owing to the circular formation of the hot zone 20 of the furnace chamber 11 the effect of a cyclone is produced upon the particles by the violent swirling action imparted to them and a consequent centrifugal force is generated which causes the particles to impinge against one another and against the surface of the furnace chamber such that as the particles reach their pyro-plastic condition they adhere to one another and in batches upon said surface and grow into agglomerate masses as shown at 29 in FIG. 3, until they become massive enough to fall by gravity from said surface on to the floor of the furnace chamber and consequently to a cooler zone of said chamber.

The floor 13 of the furnace chamber may be inclined downwardly towards a discharge opening 30 so that the agglomerate masses will discharge themselves from the furnace chamber as they fall or be pushed out manually by a scoop 31 for cooling off.

By virtue of the fact that the material which is fed into the furnace chamber is the material which has been produced in the spray drier of FIG. 2 (and thus includes very little fines) it has been found that only a very small proportion of the material has been entrained in the flue gases and carried out of the furnace chamber thereby. Less than 10% of the material has been lost in this way, and it will be understood that this represents a considerable saving of material over the previously described known method of forming the agglomerate masses of material and that this is a considerable cost saving when the raw materials being used are relatively expensive materials.

When the agglomerate masses are to be used for the manufacture of porous refractory bricks or other shapes, said masses, as discharged from the furnace chamber but in cooled and hardened condition, are broken up into small masses by passing them through roll crushers and screening them into various sizes and graded for the largest size to pass through not larger than, say for example a 3/16" wire mesh screen. This material can be used in conventional brick making or in the manufacture of lightweight refractory monolithics.

Various modifications may be made. For example, the furnace may be differently constructed and the waste heat from the furnace maybe used to provide the heat for the spray drier and may also be used to dry the products made from the highly porous refractory material produced by the inventive method. Furthermore, it will be understood that the spray drying of the slurry of raw material could be carried out in so-called rotary atomisation apparatus in which the slurry is reduced into a fine droplet spray by contact with an atomiser wheel rotating at high speed in the drying chamber.

What I claim and desire to secure by Letters Patent is:

1. A method of making a highly porous refractory material, the method including the steps of making a slurry of the raw material of argillaceous or, feeding the slurry into a spray drier to produce particles having a desired particle size range, subsequently feeding the particles into the hot zone of a furnace chamber and into contact with a gaseous medium therein which gaseous medium is discharged from said furnace chamber as flue gas, and subjecting the particles and the gaseous medium to a violent movement within the furnace chamber to cause said particles to impinge one against another and against surfaces in the hot zone of the furnace chamber, the burning of the gaseous medium producing a temperature high enough to bring the moving particles to a pyro-plastic condition to cause said impinging particles to adhere indiscriminately to one another and to surfaces of the furnace chamber to form agglomerate masses thereon, until such masses become large enough to overcome their adherence to said surfaces and fall into a cooler zone from where they are removed in burned and hardened condition, said desired particle size range being such that the loss of material due to entrainment is the flue gas in approximately 10 percent or less.

2. A method of making highly porous refractory material according to claim 1, in which the violent movement of the particles and of the gaseous medium is brought about by admitting secondary air tangentially to the furnace to produce a violent turbulence therein.

3. A method of making highly porous refractory material according to claim 1, in which a preliminary step involves the mixing together of two or more different kinds of raw material homogeneously and in the required proportions before or simultaneously with the making of the slurry.

4. A method of making highly porous refractory material according to claim 1, in which the temperature to which the particles of refractory material are subjected within the hot zone of the furnace chamber is within the range of 1000° C. to 1750° C.

5. A method of making highly porous refractory material according to claim 1, in which the temperature to which the particles of refractory material are subjected within the hot zone of the furnace chamber is within the range of 1200° C. to 1600° C.

6. A method according to claim 1 of making highly porous refractory material suitable for mixing with a bonding clay and for moulding to the required size and shape for firing in a kiln, the method including the mechanical breaking up of the artificially formed agglomerate masses to provide smaller agglomerate masses having a packing density of from 250 kg/cubic meter to 800 kg/cubic meter.

* * * * *